(12) United States Patent
Graf

(10) Patent No.: US 6,464,914 B1
(45) Date of Patent: Oct. 15, 2002

(54) METHOD AND INSTALLATION FOR THE PRODUCTION OF PRESSED-STOCK BOARDS

(75) Inventor: Matthias Graf, Eppingen (DE)

(73) Assignee: Maschinenfabrik J. Dieffenbacher GmbH & Co., Eppingen (DE)

( * ) Notice: Subject to any disclaimer, the term of this patent is extended or adjusted under 35 U.S.C. 154(b) by 0 days.

(21) Appl. No.: 09/419,812

(22) Filed: Oct. 18, 1999

(30) Foreign Application Priority Data

Oct. 16, 1998 (DE) .......................................... 198 47 814

(51) Int. Cl.$^7$ ................................................. B27N 3/08
(52) U.S. Cl. ...................... 264/109; 264/120; 264/122; 264/113; 425/194; 425/230; 425/371
(58) Field of Search ................................. 264/109, 112, 264/120, 122, 113, 194, 225, 230, 371; 156/39–42, 62.2, 62.4; 425/194, 225, 230, 371

(56) References Cited

U.S. PATENT DOCUMENTS

| | | | | |
|---|---|---|---|---|
| 4,312,822 A | * | 1/1982 | Bonnet | 264/112 |
| 5,013,229 A | | 5/1991 | Ufermann et al. | 425/83.1 |
| 5,342,566 A | | 8/1994 | Schäfer et al. | 264/102 |
| 5,531,946 A | | 7/1996 | Bold | 264/102 |
| 6,054,081 A | * | 4/2000 | Bielfeldt | 264/109 |

FOREIGN PATENT DOCUMENTS

| | | |
|---|---|---|
| DE | 976 346 | 7/1963 |
| DE | 1683991 | 11/1967 |
| DE | 2253648 | 11/1972 |
| DE | 3841276 | 5/1990 |
| DE | 41 29 466 | 3/1993 |
| EP | 0 590 095 | 4/1994 |
| JP | 57-75846 | * 5/1982 |

* cited by examiner

Primary Examiner—Mathieu D. Vargot
(74) Attorney, Agent, or Firm—Foley & Lardner

(57) ABSTRACT

The invention relates to a process and an installation for the production of pressed-stock boards in a continuous sequence. The invention includes forming and transporting the mat of pressed stock on the molding and charging belt in a space bounded at the longitudinal sides. Two upright side supporting bands on the molding and charging belt run along and guide the pressed stock or the mat of pressed stock in such a way as to limit its width from the scattering station up to compaction in the prepress. The height of these side supporting bands correspond to the changing height of the press nip. The installation includes two side supporting bands arranged upright on the molding and charging belt, on both longitudinal sides. Supporting rollers bear against the side supporting bands in the region from the scattering station up to the prepress. The side supporting bands are forcibly guided and held by supporting rollers such that they are bent with the bending plate outwardly in an L shape in the region of the prepress in a way corresponding to the respective height of the press nip.

20 Claims, 5 Drawing Sheets

METHOD AND INSTALLATION FOR THE PRODUCTION OF PRESSED-STOCK BOARDS

BACKGROUND OF THE INVENTION

The invention relates to a process for the production and installation of pressed-stock boards.

Such a process with an installation is suitable for the production of pressed-stock boards such as gypsum boards, gypsum fiberboards, cement fiberboards, boards of wood-based material such as particle boards, fiberboards and chipboards, as well as for the production of boards comprising a combined component of wood and plastic or composed of plastic with and without reinforcing inclusions.

The process and the installation are described by taking as a representative example the producing of gypsum fiberboards, it being self-evident that in the production of the pressed-stock boards enumerated above differences especially in the design of the prepress and of the main press with respect to the introduction of heat and the exertion of pressure depend on the respective pressed stock.

Generally, in the continuous production of single-layer or multi-layer gypsum fiberboards, the individual layers are scattered from a scattering station onto a molding and charging belt. During the scattering operation, the pressed stock slips away laterally, causing, at the edges of the scattered mat of pressed stock, an inclined edge of the loose fill with an angle of repose of about 45°, as illustrated in FIG. 8. This region becomes unusable due to the inadequate scattered weight, since the raw board density required in the pressing operation is not achieved. In the production of 16 mm boards, this effect makes it necessary for the edges to be trimmed by 50 mm on each side. With a customary finished board width of 2,440 mm, this already represents a material loss of 4%. In a further process step, the scattered mat of pressed stock is compacted, initially in a prepress and subsequently in a main press, in order to drive out the air accumulated in the loose fill.

In the production of 16 mm boards, the scattering height is about 80 to 100 mm. The scattered mat of pressed stock is compacted in the prepress to an exiting height of about 18 to 25 mm. In the first part of the main press, the remaining compaction of the board to nominal size then takes place. During this pressing of the mat of pressed stock, horizontally acting forces are released within the mat of pressed stock, causing the scattered material to be squeezed out to the sides and leading to a widening of the mat of pressed stock. The frictional forces present at the surfaces in contact with the upper and lower pressing belts oppose the horizontal forces and reduce the increase in width. This results in a bulging, as in FIG. 9 shows. The material which is displaced outward originates only from the border region of the mat of pressed stock. Further in within the mat of pressed stock, a sufficiently large opposing force has formed, so that the latter is in equilibrium with the horizontal forces and no material displacements take place in the horizontal direction. The displacement of the material from the border region has the consequence that not only the bulging even after the pressing operation has to be trimmed, but so too does the entire region of displacement, in which there is no longer sufficient material to achieve the required apparent density. In the production of 16 mm boards, trimming of a further 50 mm per edge is required as a result. Consequently, altogether 8% of the originally scattered material has to be trimmed. At the same time, it is only with difficulty that the trimmed material can be fed back to the production process, since the gypsum has already set and may lead to the formation of lumps during recirculation. This results not only in costs due to the loss of material, but also in costs for the disposal or reprocessing of the waste.

In the production process according to European Patent 0 590 095, the water necessary for hydration is added only after the scattering of the individual layers. After the addition of water, the pressed stock gains a very high force of adhesion.

Tests already carried out to support the scattered mat of pressed stock within the scattering station with fixed side walls and also to guide it through the prepress, in a way corresponding to already known scattering walls, for example according to German Patent 576 346 in the production of wood fiberboards, have failed. The fibers and the gypsum stick to fixed side walls and material builds up to form layers of relatively great thickness, which within just a few hours make the installation inoperative.

It is known in the case of installations for the production of gypsum fiberboards according to the wet method, in which excess water is used and squeezed out during the pressing operation, to provide a side limitation by way of a circulating belt of foam material composed of cellular Vulkollan. In the wet method, however, there are only low compaction ratios of about 1:2, since the pressed stock is already of a high density.

In the production of gypsum fiberboards by the dry method according to European Patent 0 590 095, there is a compaction ratio of 1:4 to 1:7. A foam material which serves as a scattering wall in the region of the scattering station and subsequently runs along with the belt through the prepress and main press in order to act there as a side limitation must likewise withstand this compaction ratio. It has been found in practice that such soft foam materials have only very short service lives. Gypsum crystals and perlite get into the pores of the foam material and destroy it by their abrasive action. Moreover, they are so soft that, under the horizontal forces occurring during compaction of the mat of pressed stock, they move away outward and consequently only prevent squeezing out on a limited basis.

A further problem of flexible foam materials is that the foam material immediately reverts to its original shape on leaving the press after the pressing operation. Since it is firmly interlocked with the product due to the horizontal forces acting in the press, when the foam material breathes the outside edge of the product is pulled up with it and delamination of the edge region is the consequence.

A further disadvantage of a flexible edge limitation is that the foam material hermetically seals the space between the upper and lower transporting belts and consequently the accumulated air in the pressed stock can no longer escape to the sides. The air can then only escape forward, counter to the direction of production, or downward through the metal mesh belt.

SUMMARY OF THE INVENTION

An object of the present invention is an installation having a process for effectively limiting the width of the mat of pressed stock from the scattering station through the prepress and, if appropriate, also through the main press.

Another object of the present invention is to ensure satisfactory side limitation of the pressed stock or of the mat of pressed stock up to when the finished board leaves the prepress or the main press.

A further object of the present invention is eliminate a need for trimming of the board produced, which has an advantageous effect as a cost factor per unit of board produced.

Another object of the present invention is to create a homogeneous density over the entire cross section of the board, the board being of quality construction at a reduced cost.

The forming and transporting of the mat of pressed stock takes place on the molding and charging belt in a space bounded at the longitudinal sides, two upright side supporting bands on the molding and charging belt running along therewith and guiding the pressed stock and the mat of pressed stock formed from it in such a way as to limit its width from the scattering station up to compaction in the prepress and in that the height of these side supporting bands correspond to the changing height of the press nip.

The installation for carrying out the process according to the invention consists in that two side supporting bands, forming a rectangular box for a loose fill, are arranged upright on the molding and charging belt, on both longitudinal sides, and are guided such that, from the scattering station to through the prepress, they run synchronously with the molding and charging belt. After the prepress, they run back in a circulating manner, supporting rollers bearing against the side supporting bands in the region from the scattering station up to the prepress. The side supporting bands being forcibly guided and held by supporting rollers such that they are bent with the bending plate outwardly in an L shape in the region of the prepress in a way corresponding to the respective height s of the press nip.

Further advantageous measures and refinements of the subject matter of the invention emerge from the following description with the drawings.

DETAILED DESCRIPTION OF THE PREFERRED EMBODIMENTS

Figure 1:
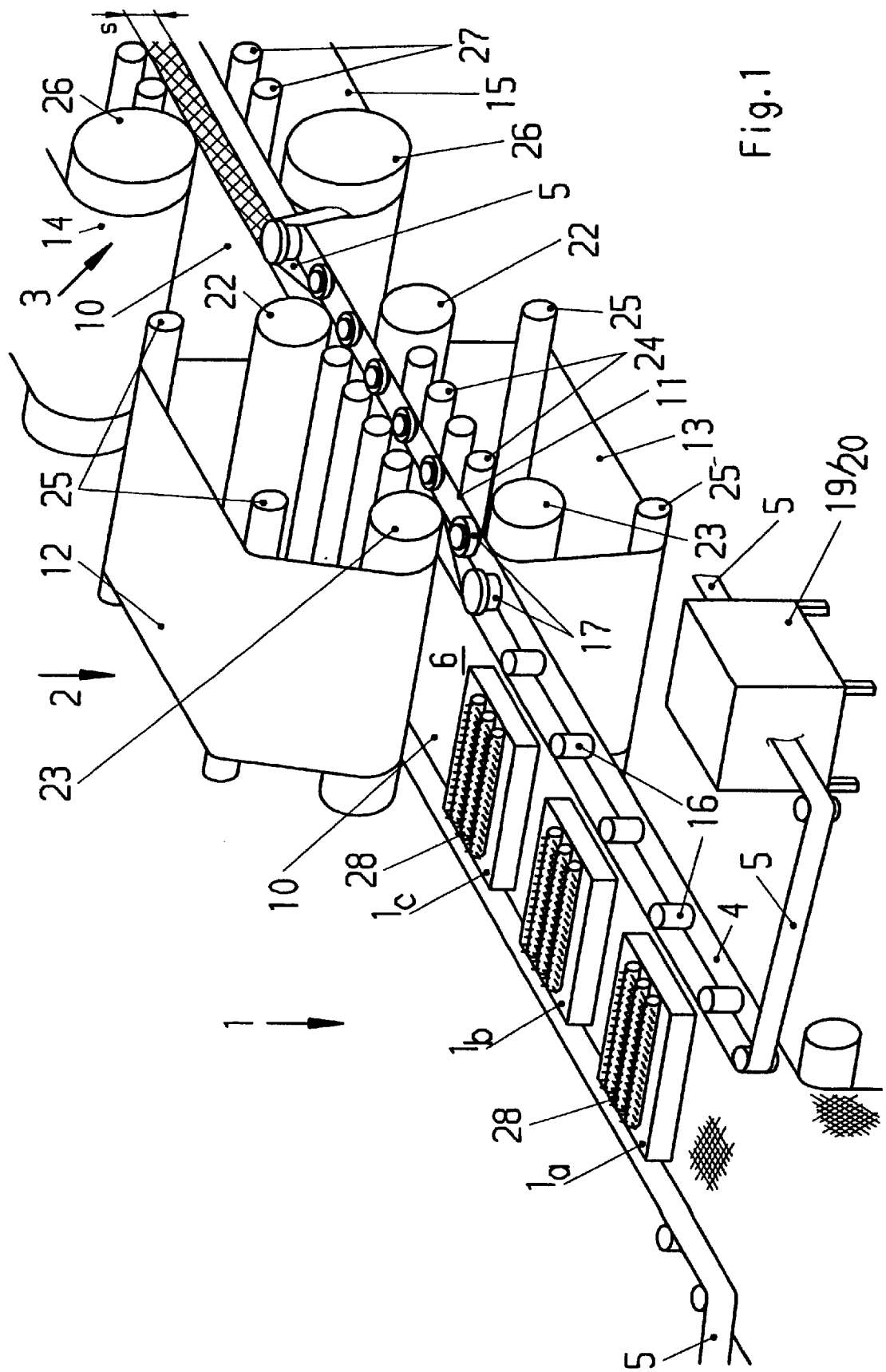
FIG. 1 shows a perspective view of the installation according to the invention.
Figure 2:
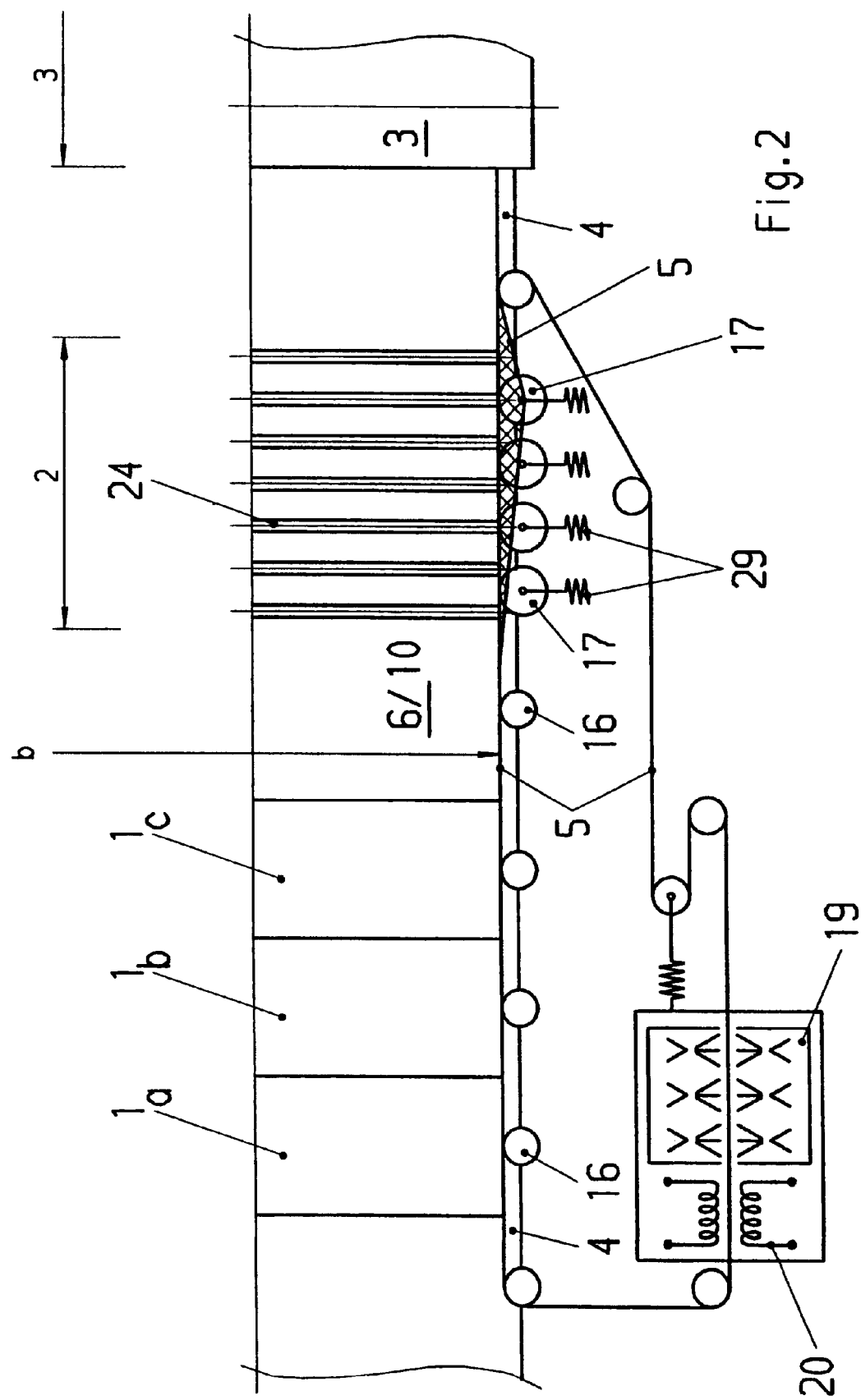
FIG. 2 shows the lower half of the installation according to FIG. 1 in a plan view.

FIG. 1 shows the installation according to the invention in a perspective representation and FIG. 2 shows a partial plan view of the lower half with a scattering station 1, prepress 2 and main press 3. As support for the side borders, endless side supporting bands 5, standing upright on the molding and charging belt 4 on both sides, run along therewith in a circulating manner.

Figure 3:
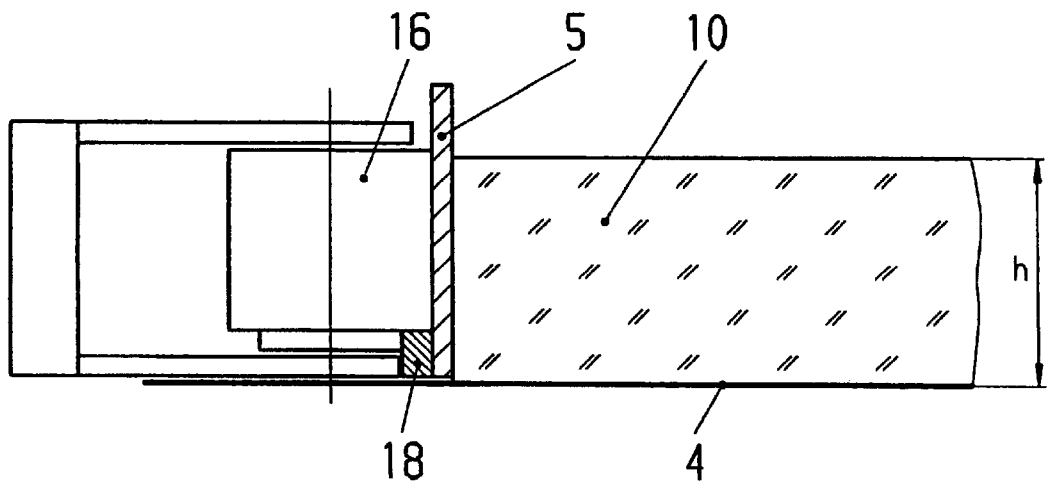
FIG. 3 shows the side limitation of the mat of pressed stock in a detail on one longitudinal side in the region of the scattering station.
Figure 4:
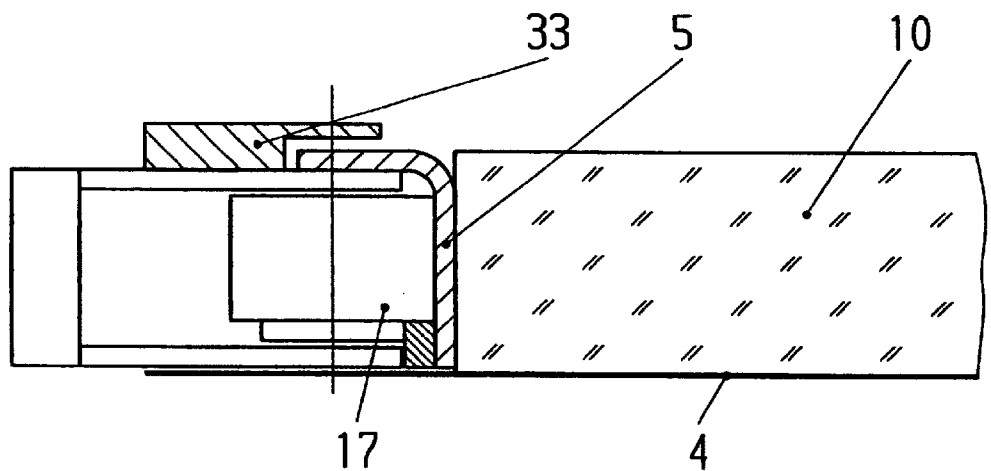
FIG. 4 shows the side limitation of one longitudinal side in the compacting nip of a press.
Figure 5:
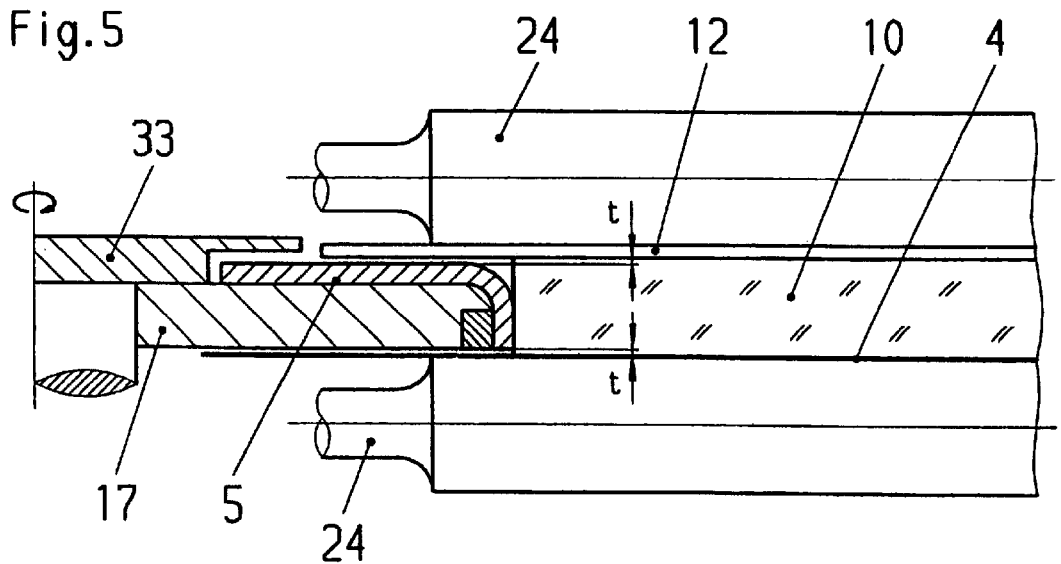
FIG. 5 shows the side limitation of one longitudinal side in the pressing region of a press.
Figure 8:
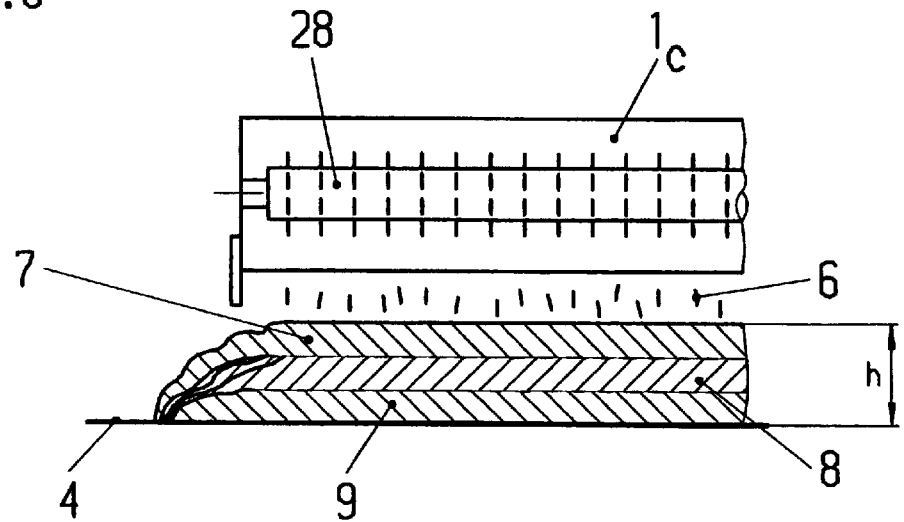
FIG. 8 shows an inclined edge of the loose fill of the pressed stock according to the prior art described.
Figure 9:
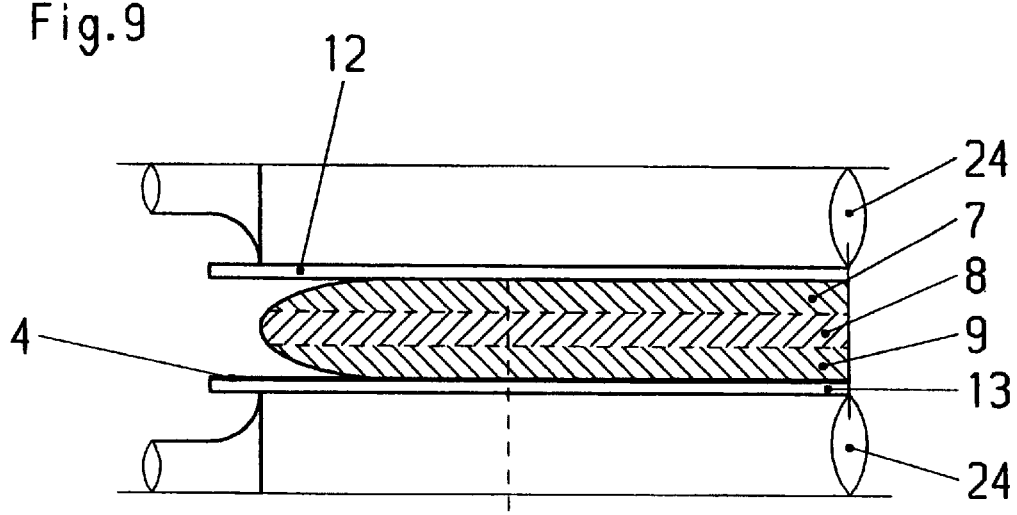
FIG. 9 shows the bulging of the mat of pressed stock during compaction with a diagram according to the prior art described.
Figure 9:
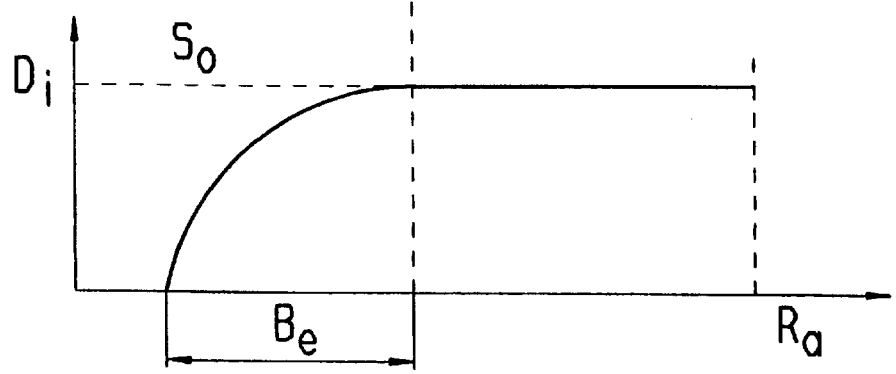

For the precompaction of the mat of pressed stock 10, the prepress 2 with the endless pressing belts 12 and 13 is arranged upstream of the main press 3. With support provided by the pressure rollers 24, the pressing belts 12 and 13 limit the precompaction region and are driven by the driving cylinders 22 and are guided in the compacting nip 11 of the mat of pressed stock 10 by the deflecting cylinders 23 and guide rollers 25. Like the prepress 2, the main press 3 is likewise designed as a so-called double-belt press and comprises the upper pressing belt 14, the lower pressing belt 15, which are guided around deflecting rollers 26, these pressing belts 14, 15 enclosing the press space as press nip s. Serving as support for the press space and the pressing belts 14 and 15 are pressure rollers 27. As can be seen from FIGS. 1, 8 and 9, the scattering station 1 of the installation has three scattering enclosures 1a, 1b and 1c for the scattering of the pressed stock 6 in three layers, namely the upper outer layer 7, the middle layer 8 and the lower outer layer 9. For the distribution of the pressed stock on the molding and charging belt 4, scattering rollers 28 are respectively fitted in the scattering enclosures 1a to 1c. FIG. 9 shows in the associated diagram the usable width of the pressed-stock board 32 at the distance from the border Ra, along with the possibly necessary trimming width Be, the desired density So with the density Di. The two side supporting bands 5 are expediently produced from a plastic woven-fabric band, are initially placed vertically upright on the molding and charging belt 4 on both sides in a manner corresponding to the scattering width b and are driven synchronously with the molding and charging belt 4. Supporting rollers 16 fitted at the sides and arranged at short intervals keep the side supporting bands 5 in position, in order that they are not pressed out of position by the increasing lateral pressure produced with increasing scattering height h. Shortly before running into the prepress 2, the side supporting bands 5 are bent outward at the top, so that, viewed in the running-through direction, they assume an L shape. As can be seen from FIGS. 3, 4 and 5, the height L of the supporting rollers is governed by the running-in height and the press nip s of the prepress 2 or the main press 3.

On running through the prepress 2 or possibly also through the main press 3, the side supporting bands 5 are pressed against the mat of pressed stock 10 by specially shaped supporting rollers 17, which are variable in height and are arranged at short intervals. To be able to define the force, the supporting rollers 17 should be brought into contact in the pressing region by springs 29 or by pneumatic or hydraulic cylinders. In order that the side supporting band 5 to be bent in, in an L-shaped manner, is not clamped in between the upper and lower pressing belts 12 and 13 of the prepress 2, the supporting rollers 17 must be produced at their installation position with the bending plate 33 at a height corresponding to the distance between the upper and lower pressing belts 12 and 13. When the production thickness is changed, the supporting rollers 17 can be changed with quick-action closures, thus allowing the changing times to be reduced. All the supporting rollers 17 in the compacting nip 11 and pressing region are expediently arranged on a rail, so that they can be displaced longitudinally or possibly even be displaced automatically online, whether by motor via final control elements or by a mechanical forced guidance. Under certain circumstances, this may also be used for the adaptation to different compacting nips (11). Supporting rollers 17 of different thicknesses could also be fastened on stellate or radial holders, which bring the required supporting roller 17 into engagement with the side supporting band 5 according to control pulses.

To give the side supporting bands 5 greater rigidity, they are supported by a supporting belt 18, which is fitted on the lower edge of the side supporting bands 5. This gives the side supporting bands 5 a greater intrinsic rigidity at the lower edge. Consequently, even when idling, the side supporting bands 5 can be brought into the desired L shape when running into the prepress 2. Moreover, the supporting intervals between the supporting rollers 17 can be chosen to be greater.

Figure 6:
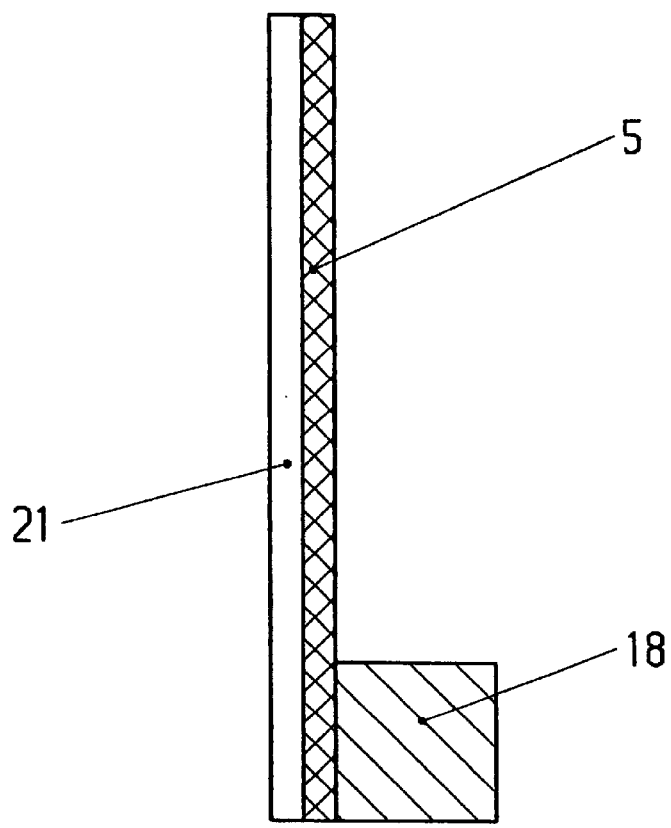
FIG. 6 shows a cross section of a side supporting band with a supporting belt.

According to FIG. 6, a 0.5–1.2 mm thick woven-fabric band of polyester with a polyurethane coating 21 on the carrying side is used for the side supporting bands 5. The thin side supporting bands 5 allow very small bending radii of 2–4 mm when they go into the L shape. In order that the side supporting band 5 is not overstretched, a corresponding radius is formed on the supporting rollers 17. The polyurethane coating 21 of the side supporting bands 5 has a very low adhesion tendency with respect to the mat of pressed stock 10. It is easy to clean and has a much greater wear resistance in comparison with a flexible foam material. Between the upper and lower pressing belts 12, 13 of the prepress 2, the set height of the side supporting bands 5 is deliberately left an air gap t. This ensures that the gases forced out of the mat of pressed stock 10 can escape unhindered.

In the return run, the side supporting bands 5 must be cleaned of adhering production residues in a cleaning station 19.

Drying of the side supporting bands 5 in a drying device 20 is subsequently required, in order to prevent the gypsum reacting chemically on contact with the moist side supporting bands 5.

The side limitation could be already taken out of the system after the prepress 2, to run back again to the beginning of the scattering station 1. When dispensing with side limitation in the main press 3, under certain circumstances it is possible for squeezing out to occur, in the range of about 10 mm per side, in other words the question as to whether the side limitation is to be taken both through the prepress 2 and through the main press 3 must be decided from case to case, according to the value of the pressed stock used, the height and width of the finished boards and other criteria. The supporting rollers 16 and the supporting rollers 17 must be provided with a brush system or scraper system, in order to prevent a build-up of material on them.

Figure 7:
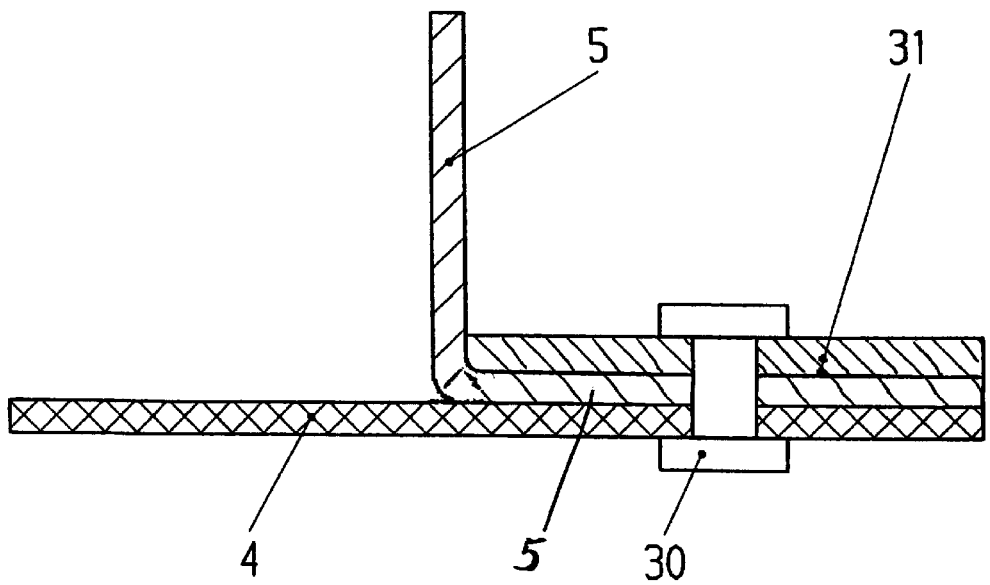
FIG. 7 shows the side supporting band of one longitudinal side on the molding and charging belt in cross section.

According to FIG. 7, a good solution is also to integrate the side supporting bands 5 directly in the lower molding and charging belt 4. For this purpose, the side supporting bands 5, for example, may be of the material described above, with a plastic strip 31 bolted onto the lower molding and charging belt 4, preferably on a metal mesh belt, or be riveted on with rivets 30.

Additional advantages and modifications will readily appear to those skilled in the art. The invention, therefore, is not limited to the specific details and representative devices shown and described herein. Accordingly, various modifications may be made without departing from the scope of the invention.

The priority document here, German application 198 47 814.3 filed Oct. 16, 1998, is hereby incorporated by reference.

What is claimed is:

1. A method for continuously producing pressed-stock boards by scattering pressed stock in at least one layer onto a molding and charging belt forming a mat of pressed stock, guiding the mat of pressed stock for compacting and setting to a desired thickness in a prepress and in a main press, comprising the steps of:

forming the mat of pressed stock by the molding and charging belt in a space bounded at each longitudinal side by two upright side supporting bands, thus forming the mat of pressed stock with a limited width; and guiding the mat of pressed stock by the molding and charging belt from a scattering station up to compaction in the prepress, a height of the side supporting bands corresponding to a changing height of a press nip.

2. The method of claim 1, wherein the limited width of the mat of pressed stock by the side supporting bands occurs in a region of the main press.

3. An installation for carrying out the method of claim 1, comprising the scattering station, the molding and charging belt, the prepress and the main press, the molding and charging belt receives scattered press stock and circulates under the scattering station through the prepress and the main press, the two side supporting bands, forming a rectangular box for a loose fill, are arranged upright on the molding and charging belt, on each longitudinal side, and are guided from the scattering station through the prepress, synchronously with the molding and charging belt and, after the prepress, the two side supporting bands circulate back, supporting rollers bearing against the side supporting bands in a region from the scattering station to the prepress, the side supporting bands being forcibly guided and held by supporting rollers outwardly bent with a bending plate in an L shape in a region of the prepress corresponding to the respective height of the press nip.

4. The installation of claim 3, wherein the side supporting bands are guided in a circulating manner in the region of the main press.

5. The installation of claim 3, wherein the molding and charging belt includes a metal mesh belt.

6. The installation of claim 4, wherein the side supporting bands include a plastic woven-fabric band.

7. The installation of claim 3, wherein the mat of pressed stock includes three layers, outer layers composed of a mixture of recycled paper fibers and calcined gypsum and a middle layer composed of granular perlite.

8. The installation of claim 3, wherein the mat of pressed stock includes a mixture of wood fibers and calcined gypsum.

9. The installation of claim 3, wherein the pressed stock includes wood particles or wood fibers or wood chips.

10. The installation of claim 3, wherein the pressed stock includes cement and fibers.

11. The installation of claim 3, wherein the pressed stock includes a combined component of wood and plastic, the plastic has reinforcing inclusions.

12. The installation of claim 3, wherein the pressed stock includes a combined component of wood and plastic and is composed of plastic.

13. The installation of claim 3, further comprising supporting rollers, the supporting rollers are exchangeable and can be fitted on holders by quick-action closures.

14. The installation of claim 4, wherein the supporting rollers are arranged in a horizontally displaceable manner in a compacting nip of the prepress.

15. The installation of claim 4, wherein the side supporting bands are reinforced at a lower edge by a supporting belt.

16. The installation of claim 4, wherein the side supporting bands are reinforced at a lower edge by a plastic strip.

17. The installation of claim 4, wherein the side supporting bands include a polyester woven fabric and a polyurethane coating is included at a side of the mat of pressed stock.

18. The installation of claim 3, further comprising a cleaning station and a drying device on a return run of the side supporting bands.

19. The installation of claim 3, wherein a brush cleaning system or a scraper cleaning system is respectively arranged in a region of the supporting rollers.

20. The installation of claim 4, wherein the side supporting bands are bolted on, riveted onwith rivets adhesively bonded on or vulcanized on the molding and charging belt longitudinally in an L shape.

* * * * *